Jan. 22, 1929.
C. WESTER
1,700,008
STUMP PULLER
Filed May 13, 1927
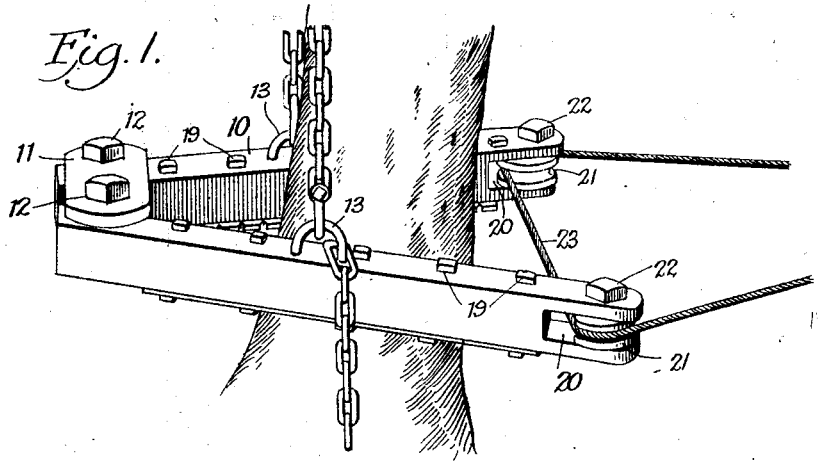
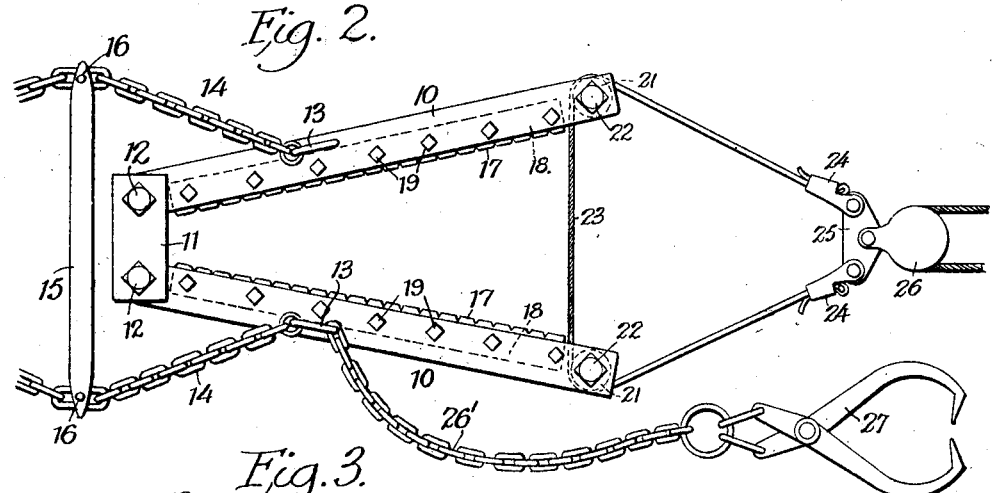
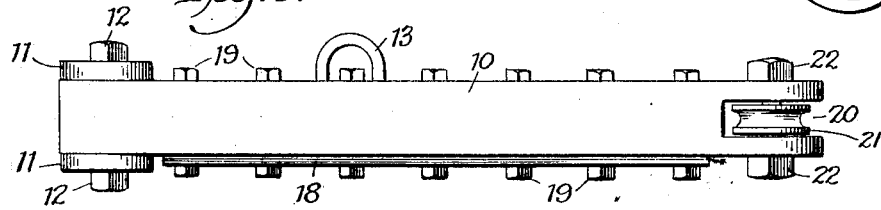
Inventor,
Chris Wester,
By
Attorney Patented Jan. 22, 1929.

1,700,008

UNITED STATES PATENT OFFICE.

CHRIS WESTER, OF PALATKA, FLORIDA, ASSIGNOR TO BOONE AND WESTER, OF CEDAR KEY, FLORIDA, A COPARTNERSHIP COMPOSED OF W. W. BOONE AND CHRIS WESTER.

STUMP PULLER.

Application filed May 13, 1927. Serial No. 191,184.

My invention relates to a stump puller and it is an object of the invention to provide a device of this character by means of which stumps may be easily uprooted and such uprooted stumps, logs, and the like may be deposited in piles in clearing land, all as will be hereinafter more fully described and claimed.

Referring to the drawings, which are made a part hereof and in which similar reference characters indicate similar parts, Figure 1 is a perspective illustrating one application of my invention, Figure 2, a top plan view, Figure 3, a side elevation, Figure 4, a detail of the serrated jaw teeth.

In the drawings reference character 10 indicates a pair of stump engaging jaws pivotally connected at one end by a pair of opposed plates 11 connected by pivot bolts 12. The jaws 10 are provided on their upper sides with eyes or staples 13 which are disposed slightly nearer the connected ends of the jaws and by means of which the said jaws are supported. A chain 14 is connected to each of the eyes 13 and has its opposite end provided with a hook or other device by means of which the chain is connected to a supporting boom (not shown). A separating or spreader member 15 is provided which in the present instance comprises a pipe, the extremities of which are provided with bolts 16 which extend through links of the chain 14. By providing the eyes 13 on the upper surface of the jaws 10 the jaws are prevented from hanging in a vertical position but will be supported at a slight angle from the vertical and simplify the operation of placing the stump puller on the stump to be pulled.

The jaws 10 are preferably provided with teeth 17 which project inwardly between the jaws for a sufficient distance to penetrate into the stump through the bark of the same so that a firm hold is obtained on the same. In practice, the teeth 17 extend inwardly approximately an inch when mounted upon jaws approximately six inches by six inches in cross section, and approximately six feet in length. The teeth 17 are preferably formed by serrating or notching one edge of a bar 18 which is secured to the jaw by means of bolts 19.

The ends of the jaws 10 opposite their connected ends are bifurcated at 20, in which bifurcations are mounted sheave wheels 21 pivoted upon bolts 22. About the sheave wheels 21 is disposed a cable 23 of a length substantially equal to the combined lengths of the jaws 10 and the ends of said cable are secured in wedge sockets 24 which are pivoted to a connecting plate 25 which is connected by a block 26 with the source of power in any desired manner.

In order to facilitate pulling of the stumps, I preferably connect a chain 26' to one of the eyes 13 and to the opposite end of the chain I connect tongs 27. The tongs may be used not only for assisting in engaging the stump during the pulling operation, but may be also used for engaging uprooted stumps or logs for piling them together and clearing ground.

Power for the stump puller may be supplied from any suitable machine such as a tractor or the like with the stump puller suspended from a hoisting line over the end of a movable boom and by means of movement of the boom the stump puller may be brought into position over the stump to be pulled. Upon being in position over the stump to be pulled the drag line leading to the source of power is first tightened to bring the puller into horizontal position, whereupon the puller is dropped over the stump prior to the application of the full power of the machine. The drag line is then further tightened and there is first a biting action of the teeth of the jaws into the stump and subsequently the stump is pulled toward the machine until it is entirely uprooted whereupon the hoisting line raises the stump puller and stump clear of the ground and the boom may be swung about to deposit the stump in a pile or otherwise dispose of the pulled stump.

The stump is dropped out of the puller automatically, that is when the power is partially released from the drag cable to permit the puller to be raised by the hoisting cable when the point is reached where it is desired to drop the same, the drag line is entirely slacked off and the weight of the stump puller with the spreading action of the pipe spreader upon the jaws causes them to separate and discharge its load.

It will be obvious to those skilled in the art that various changes may be made in my device, without departing from the spirit of my invention, and I, therefore, do not limit myself to what is shown in the drawings and described in the specification, but only as set forth in the appended claims.

Having thus fully described my invention, what I claim as new and desire to secure by Letters Patent is:

1. A stump puller comprising a pair of jaws pivotally connected at one end, a cable connected at the opposite ends of said jaws, and adapted to be operated for drawing the jaws together, and means for supporting said jaws in horizontal position and connected to the intermediate portions of the jaw, substantially as set forth.

2. A stump puller comprising a pair of jaws pivotally connected at one end, a cable connected at the opposite ends of said jaws, and adapted to be operated for drawing the jaws together, and means for supporting said jaws, comprising supporting members connected to said jaws intermediate their ends and a spacing member between said supporting members, substantially as set forth.

3. A stump puller comprising a pair of jaws, means for pivotally connecting said jaws at one end, means for drawing said jaws toward each other at their opposite ends, a supporting means for said jaws, a connection from said supporting means to the upper surface of each jaw adjacent said pivotal connection, and means for maintaining said connections in spaced relation, substantially as set forth.

4. A stump puller comprising a pair of jaws, a bar carried by each of said jaws and having teeth formed at one edge of the same, said teeth projecting inwardly from each jaw, a supporting means for said jaws, a flexible connection from said supporting means to each of said jaws between the center and pivoted end of the jaw, and means for contracting said jaws, substantially as set forth.

5. A stump puller comprising a pair of jaws, a bar carried by each of said jaws and having teeth formed at one edge of the same, said teeth projecting inwardly from each jaw, a supporting means for said jaws, a flexible connection from said supporting means to each of said jaws between the center and pivoted end of the jaw, means for contracting said jaws, said jaws being adapted to be moved horizontally for uprooting a stump and adapted to be moved vertically for lifting the stump from its uprooted position, substantially as set forth.

6. The combination of opposed stump engaging members, means adapted to be operated for contracting the stump engaging members for causing them to clamp upon a stump and for simultaneously pulling the stump over and uprooting the same, and supporting means for the opposed stump engaging members engaging the intermediate portions of the same whereby the stump may be elevated from its uprooted position, substantially as set forth.

In witness whereof, I have hereunto set my hand at Cedar Key, Florida, this 10th day of May, A. D. nineteen hundred and twenty-seven.

CHRIS WESTER.